US006792769B2

(12) United States Patent
Trulaske, Sr.

(10) Patent No.: US 6,792,769 B2
(45) Date of Patent: Sep. 21, 2004

(54) CLEANING SYSTEM FOR REFRIGERATOR CONDENSER

(75) Inventor: Steven L. Trulaske, Sr., Ladue, MO (US)

(73) Assignee: True Manufacturing Co., Inc., O'Fallon, MO (US)

(*) Notice: Subject to any disclaimer, the term of this patent is extended or adjusted under 35 U.S.C. 154(b) by 0 days.

(21) Appl. No.: 10/017,333

(22) Filed: Dec. 14, 2001

(65) Prior Publication Data

US 2002/0124586 A1 Sep. 12, 2002

Related U.S. Application Data

(60) Provisional application No. 60/273,703, filed on Mar. 6, 2001, and provisional application No. 60/317,588, filed on Sep. 6, 2001.

(51) Int. Cl.[7] .......................... F25B 19/00; F25D 17/02; F28G 15/06; F28G 13/00; F28G 9/00
(52) U.S. Cl. .......................... 62/231; 62/303; 165/232; 165/95; 165/97
(58) Field of Search .......................... 165/231, 95, 97, 165/232; 62/303, 232

(56) References Cited

U.S. PATENT DOCUMENTS

| 1,967,019 | A | | 7/1934 | Buchanan | 62/3 |
|---|---|---|---|---|---|
| 2,525,462 | A | | 10/1950 | Shell | 62/4 |
| 2,665,560 | A | * | 1/1954 | Hubbard | |
| 3,021,686 | A | * | 2/1962 | Alt | |
| 3,022,639 | A | * | 2/1962 | Brown et al. | |
| 3,218,819 | A | * | 11/1965 | Crotser | |
| 3,344,854 | A | | 10/1967 | Boyajian | 165/119 |
| 3,518,841 | A | * | 7/1970 | West, Jr. | |
| 3,569,806 | A | * | 3/1971 | Brallsford | 318/254 |
| 3,735,216 | A | * | 5/1973 | Uemura | 318/138 |
| 4,344,295 | A | * | 8/1982 | Linstromberg | |
| 4,358,933 | A | * | 11/1982 | Horvay | |
| 4,522,036 | A | * | 6/1985 | Van Gils | 165/97 |
| 4,668,898 | A | * | 5/1987 | Harms et al. | 318/254 |
| 5,050,667 | A | | 9/1991 | Berner et al. | 165/4 |
| 5,211,028 | A | | 5/1993 | Remo | 62/303 |
| 5,226,285 | A | | 7/1993 | Dankowski | 62/184 |

FOREIGN PATENT DOCUMENTS

| DE | 1112094 | * | 8/1961 |
|---|---|---|---|
| DE | 3735726 | * | 5/1989 |
| EP | 0081722 | * | 6/1983 |
| JP | 61-86598 | * | 5/1986 |
| JP | 02-223771 | * | 9/1990 |
| JP | 04-366366 | * | 12/1992 |
| JP | 04-371768 | * | 12/1992 |
| JP | 03-207074 | * | 2/1993 |
| JP | 10-054602 | * | 2/1998 |
| JP | 11-201691 | * | 7/1999 |
| JP | 2000-123238 | * | 4/2000 |

OTHER PUBLICATIONS

Derwent ACC No. 2001–483723, Abstract CN1166588A (Dec. 3, 1997).*

* cited by examiner

*Primary Examiner*—John K. Ford
(74) *Attorney, Agent, or Firm*—Polster, Lieder Woodruff, & Lucchesi L.C.

(57) ABSTRACT

This cleaning system includes a compressor driven by a motor, a condenser; a cooling fan for directing an air stream at the condenser during normal operation, a motor drive system for driving the fan, and a timing device for reversing the rotational direction of the fan motor to direct the stream of cooling air away from the condenser to remove debris collected on the condenser and clean the condenser during a cleaning cycle. The fan is driven by drive system having a solid state commutated motor or a drive system having a reversible permanent split capacitor motor. The timing device includes a timer for controlling the time periods during the normal operation (cooling) cycle and during the cleaning cycle.

26 Claims, 8 Drawing Sheets

CLEANING SYSTEM FOR REFRIGERATOR CONDENSER

CROSS REFERENCE TO RELATED APPLICATIONS

Provisional Application No. 60/273,703 filed Mar. 6, 2001.

Provisional Application No. 60/317,588 filed Sep. 6, 2001.

STATEMENT REGARDING FEDERALLY SPONSORED RESEARCH OR DEVELOPMENT

Not Applicable.

BACKGROUND OF THE INVENTION

This invention relates generally to a refrigeration system and particularly to a system for maintaining the condenser in a clean, dirt-free and lint-free condition.

Refrigeration systems which include a compressor, a condenser coil, and an electric motor driven fan for blowing air on the condenser coil suffer from reduced efficiency as the condenser coil collects dirt and lint over time. Because of this reduced efficiency it is necessary to subject the condenser coils to periodic cleaning resulting in down time of the system and in some cases costly repairs.

Various cleaning systems have been used in an attempt to obviate this problem. In particular, attempts have been made to eliminate the collection of lint and dirt resulting from the continuous blowing of air in one direction over the condenser by reversing the direction of the air stream over the condenser to blow collected lint and dirt off the condenser. The patents discussed below which relate to this problem are incorporated by reference herein.

An early patent which utilizes this principle of air stream reversal is U.S. Pat. No. 1,967,019 which discloses a fan arranged to blow cooling air through a condenser. Reversal of the fan motor, a single phase induction motor, is accomplished by changing polarity of the current in the starting winding. A solenoid pawl and cam arrangement is used to operate the switching. The solenoid operates a reversing switch and is actuated by energization of the compressor motor.

U.S. Pat. No. 2,525,462 discloses air flow reversal through a condenser in a refrigerator which is accomplished by a switching arrangement controlled by a modified compressor motor circuitry so that the fan direction is reversed each time the refrigerating unit stops and starts so that the fan operates in reverse when the refrigerating unit is idle. U.S. Pat. No. 3,344,854 discloses an anticlog device for automobile radiators which provides a movable endless belt screen such that foreign matter deposited on the screen when the belt is on to one side of the radiator is blown off the screen when the belt is moved to the other side of the radiator. U.S. Pat. No. 5,050,667 discloses a ventilation system in which a fan is pivotally mounted in a duct for rotation from a first position blowing air out of one end of the duct to a second position blowing air out of the other end of the duct. U.S. Pat. No. 5,226,285 discloses a self-cleaning fan assembly in which a reversible fan is located between two condensers and reversal is effectuated by means of pressure switches so that an increase in refrigerant flow reverses the rotation of the fan motor. These systems tend to be complicated, to operate at a constant cleaning speed and suffer from a lack of control of the operation and cleaning speed and operate in reverse for relatively uncontrolled time periods. In addition, these system do not offer flexibility in the choice of cleaning duty cycles, choice of fan speed in cleaning cycles, and require fairly complicated electromechanical devices which reverse air flow to the detriment of equipment reliability.

The present reversible fan arrangement solves these and other problems in a manner not disclosed by the known prior art.

SUMMARY OF THE INVENTION

This invention provides a condenser cleaning system in which the fan runs continuously for long periods at one speed in one direction during a normal operating cycle and intermittently for short periods in a reverse direction during a cleaning cycle.

This cleaning system for the condenser of a refrigeration unit comprises a compressor including a motor, a condenser, a cooling fan including a motor and a fan blade; and control means for running the fan motor drive system at a first preselected speed in a forward direction to direct air toward the condenser for a first determined period of time and in a reverse direction to direct air away from the condenser at a second selected speed for a second predetermined period of time, the speed and the time periods being effective to prevent formation of lint on the condenser.

It is an aspect of this invention to provide that the first selected speed is less than the second selected speed in one embodiment of this invention.

It is another aspect of this invention to provide that the first predetermined time period is longer than the second predetermined time period.

It is still another aspect of this invention to provide that the fan is continuously run at the lower speed and the motor drive system reversed several times a day to run at the higher speed in the opposite direction.

It is yet another aspect of this invention to provide that the first selected speed is about 1500 rpm during normal operating cycles and the second selected speed is about 2000 rpm during cleaning cycles.

It is an aspect of this invention to provide that the reversing motor drive system is powered directly off terminals associated with the compressor motor.

It is yet another aspect of the invention to provide that the control means includes a timer.

It is another aspect of the invention to provide that the timer causes the motor drive system to run in the reverse direction for about 14 minutes after every 8 hours of compressor running time.

It is still another aspect of the invention to provide that the motor drive system includes a solid state commutated (SSC) direct current motor in one embodiment of this invention.

It is an aspect of this invention to provide that, in the case of the SSC motor, the first selected speed is less than the second selected speed.

It is another aspect of this invention to provide that, in the case of the SSC motor, the forward speed is about 1500 rpm and the reverse speed is about 2000 rpm.

It is an aspect of this invention to provide that the solid state commutated motor and the timer are electrically connected to the terminals of the compressor motor.

It is another aspect of this invention to provide that the motor drive system includes a reversible permanent split capacitor (RPSC) ac induction motor in another embodiment of this invention.

It is yet another aspect of this invention to provide that, in the case of the reversible permanent split capacitor (RPSC) motor, the first selected speed and the second selected speed are equal.

It is still another aspect of this invention to provide that, in the case of the RPSC motor, the forward speed and the reverse speed are about 1500 rpm.

It is an aspect of this invention to provide a kit for retrofitting a refrigerator unit of the type comprising a compressor, a condenser and a motor and a fan blade, with a condenser cleaning system, the kit comprising a replacement reversible condenser fan motor; control means for running the replacement motor at a first selected speed to direct air toward the condenser for a first predetermined period of time, and in a reverse direction of the motor to direct air away from the condenser at a second selected speed for a second predetermined period of time, the speed and the time periods being effective to prevent formation of lint, the control means including a timer.

It is another aspect of this invention to provide that the kit reversible motor is a solid state commutated motor.

Another aspect of this invention is to provide that the kit reversible motor is a reversible permanent split capacitor motor.

It is an aspect of this invention to provide a method of retrofitting a refrigerator unit, of the type comprising a compressor, a condenser, a condenser fan having an existing motor and a blade, with a condenser cleaning system including a reversible condenser fan motor and a timer. The method comprises the steps of disconnecting the power supply to the refrigerator unit; disconnecting the existing condenser fan motor leads from the compressor; removing the condenser fan motor; removing the condenser fan blade; installing the condenser fan blade in the same direction on the reversible condenser fan motor; installing the reversible condenser fan motor on the refrigerator unit; mounting the timer on the refrigerator unit; connecting the reversible condenser fan motor and timer power leads to the same compressor terminals from which the existing condenser fan motor leads were removed; and reconnecting the power supply to the refrigerator unit.

This condenser cleaning system is relatively inexpensive to manufacture, easy to install and operates efficiently, without maintenance, for long periods.

DESCRIPTION OF THE PREFERRED EMBODIMENT

System Overview

Figure 1:
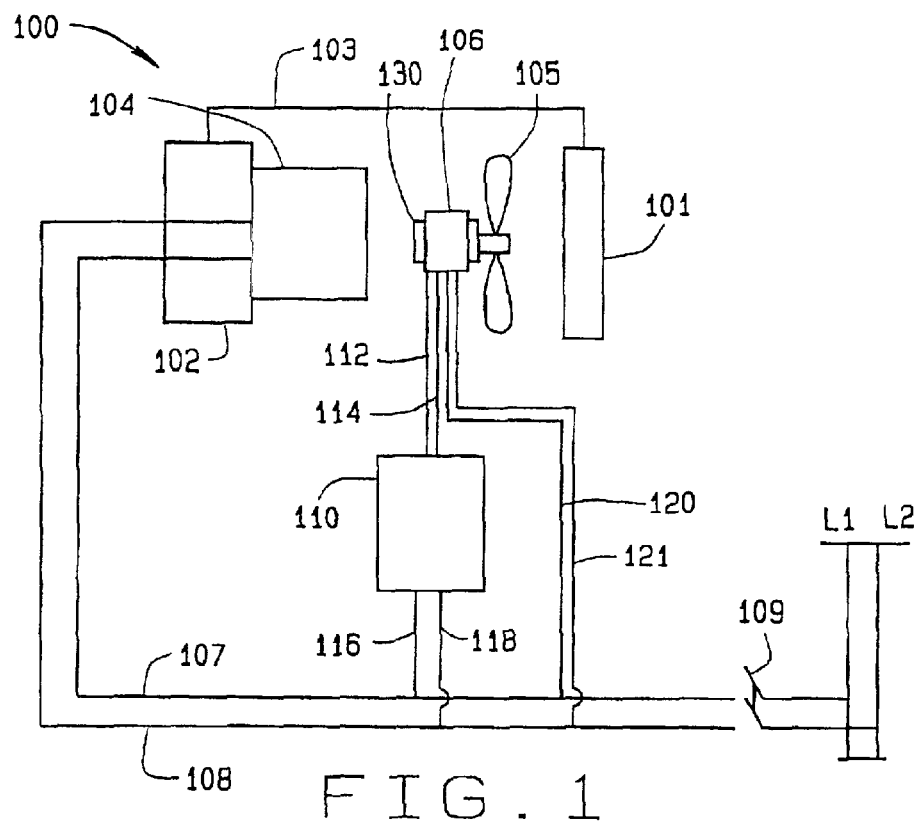
FIG. 1 is a top level block diagram of a first embodiment of the present cleaning system.
Figure 1A:
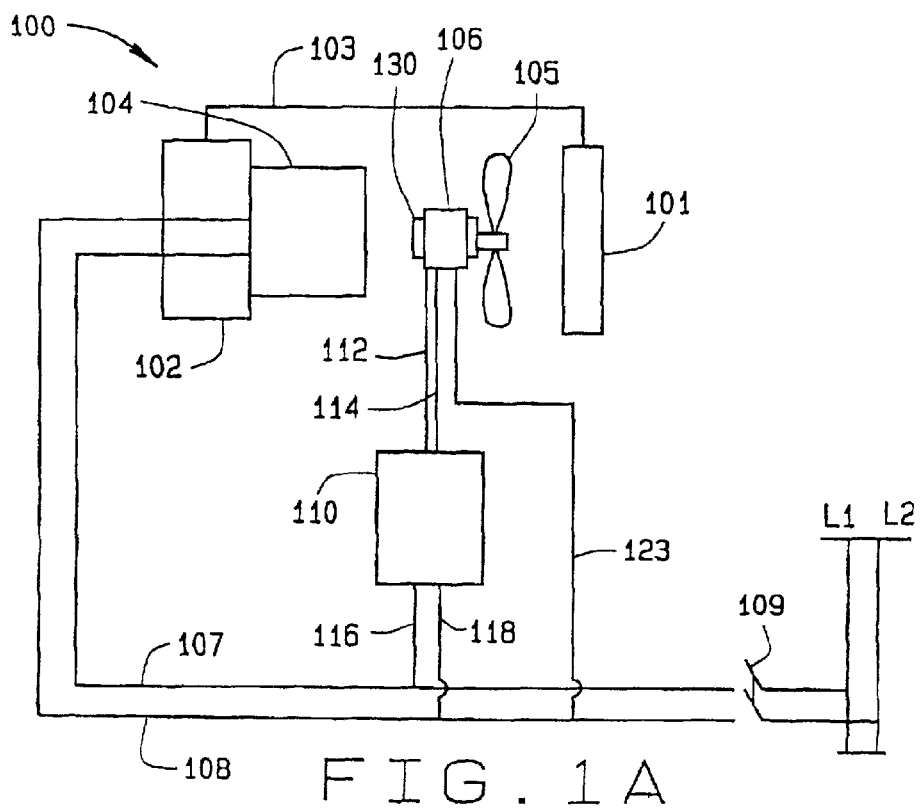
FIG. 1A is a top level block diagram of a second embodiment of the present cleaning system.

FIGS. 1 and 1A show top level block diagrams of the cleaning system 100 of the present invention that is used for maintaining a condenser associated with a refrigeration system in a clean, dirt-free and lint-free condition. The cleaning system 100 includes a condenser 101 having refrigerant delivered thereto from a compressor 102 by a conduit 103. A motor 104 drives the compressor 102, and is connected to power lines L1 and L2 via conductors 107 and 108, respectively, and thermostatically controlled main motor switch 109 when the switch 109 is closed. A fan 105 driven by a fan motor 130 associated with a motor drive system 106 forces cooling air through the condenser 101 thereby cooling the refrigerant in the condenser. Operation of the motor drive system 106 is controlled by a timing device 110.

During normal operating (cooling) cycles, the fan motor 130 and fan 105 run continuously at a desired speed in one direction. The reversal of the cooling air direction during cleaning cycles is accomplished by reversing the direction of the fan motor 130 associated with the motor drive system 106 and therefore the fan 105. As discussed below in greater detail, the fan motor 130 associated with the drive system 106 in the first embodiment of the present invention is a solid state commutated (SSC) direct current motor 130a, having a forward speed of about 1500 rpm and a reverse speed of about 2000 rpm (see FIGS. 1 and 11). In the second embodiment of the present invention shown in FIGS. 1A and 12, the fan motor 130 associated with the fan motor drive system 106 is a reversible permanent split capacitor (RPSC) ac induction motor 130b.

The fan motor drive system 106 is connected to a timing device 110 via conductors 112 and 114. As discussed below, the timing device 110 of the first embodiment is timer 110a, and the timing device in the second embodiment is timer 110b. The timer 110 is connected to the compressor motor 104 via conductors 116, 118, 107 and 108 and provides control means for reversing the fan motor 130 for predetermined short time intervals during cleaning cycles.

Figure 2:
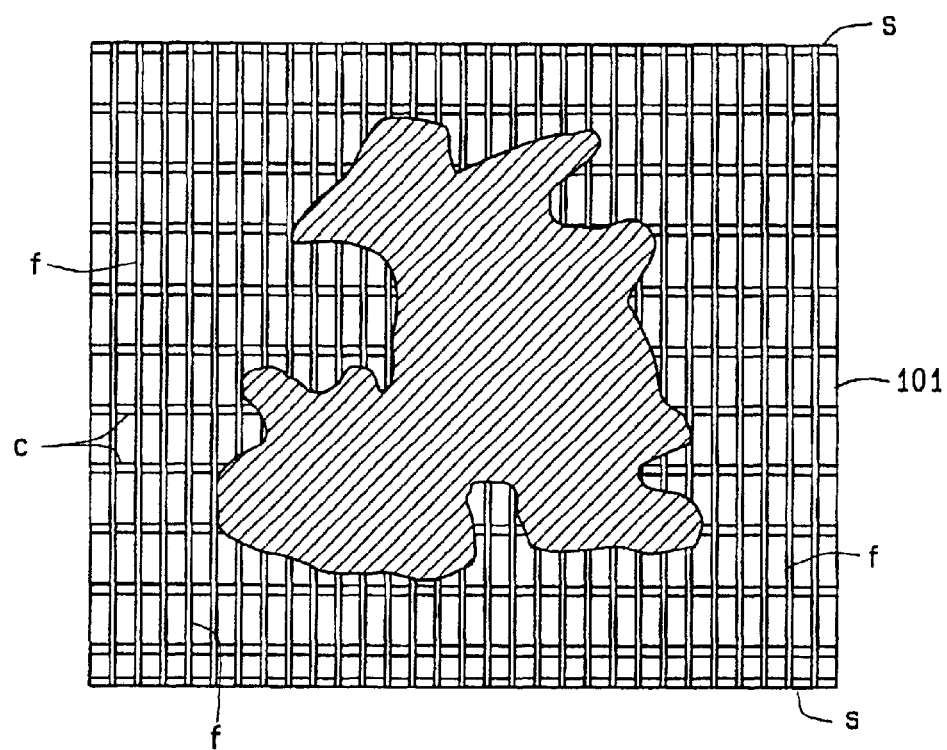
FIG. 2 is a representation of the lint and dirt collection on the fins of a condenser prior to a short test.
Figure 3:
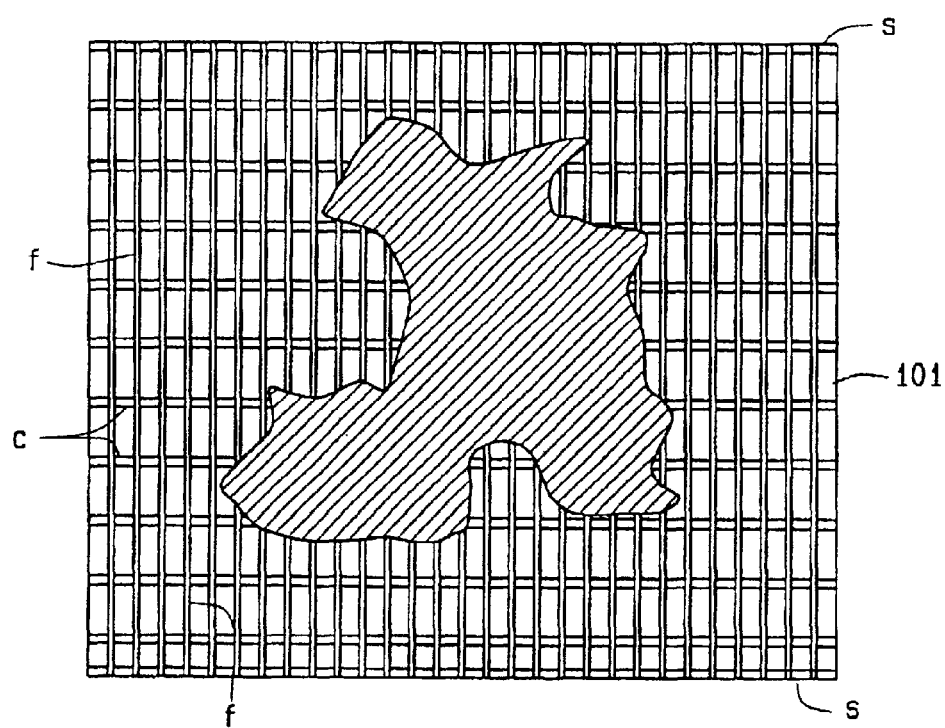
FIG. 3 is a representation of the reduction in the dirt and lint collection using the present invention following the short test.

In an initial short test period of about one month on a condenser using the cleaning system 100 of the present invention, it was found that the expected accumulation of lint on a condenser, which had been in service for some time, did not occur. To the contrary, it was slightly diminished. FIGS. 2 and 3 represent the before and after conditions of this test, respectively.

This result suggested that installing the cleaning system 100 on a merchandiser such as the GDM-26 merchandiser, manufactured by True Manufacturing Co., Inc. of O'Fallon, Mo., might eliminate the fouled condenser problem completely.

Accordingly, three GDM-26 merchandisers having conventional condensers (referred to as condensers 101a, 101b and 101c below) were set up in the same area of the plant and each was subjected to a relatively long ten month test period. Each condenser 101a, 101b, and 101c includes upper and lower horizontal supports s, horizontal coils c, and vertical fins f. The dirt and lint are shown by shading.

Figure 4:
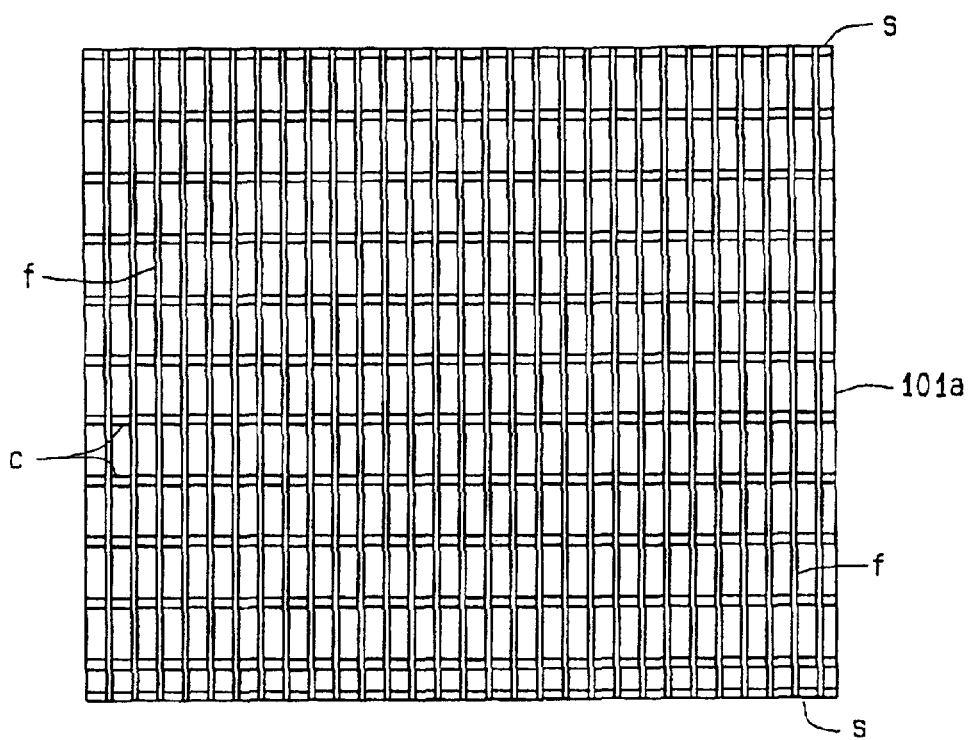
FIG. 4 shows a GDM-26 standard condenser prior to a long test.
Figure 5:
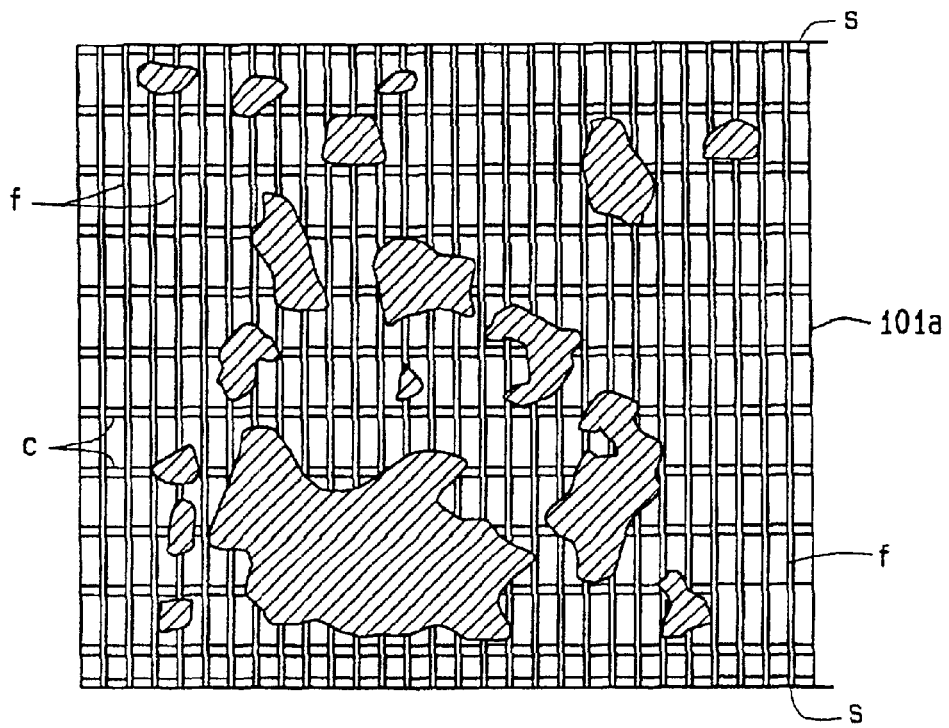
FIG. 5 shows the condenser of FIG. 4 following the long test.

The first merchandiser was provided with a standard new condenser 101a without the cleaning system 100. The before and after conditions are represented in FIGS. 4 and 5, respectively, and demonstrate clearly that at the end of the test period, the condenser 101a evidenced substantial fouling.

Figure 6:
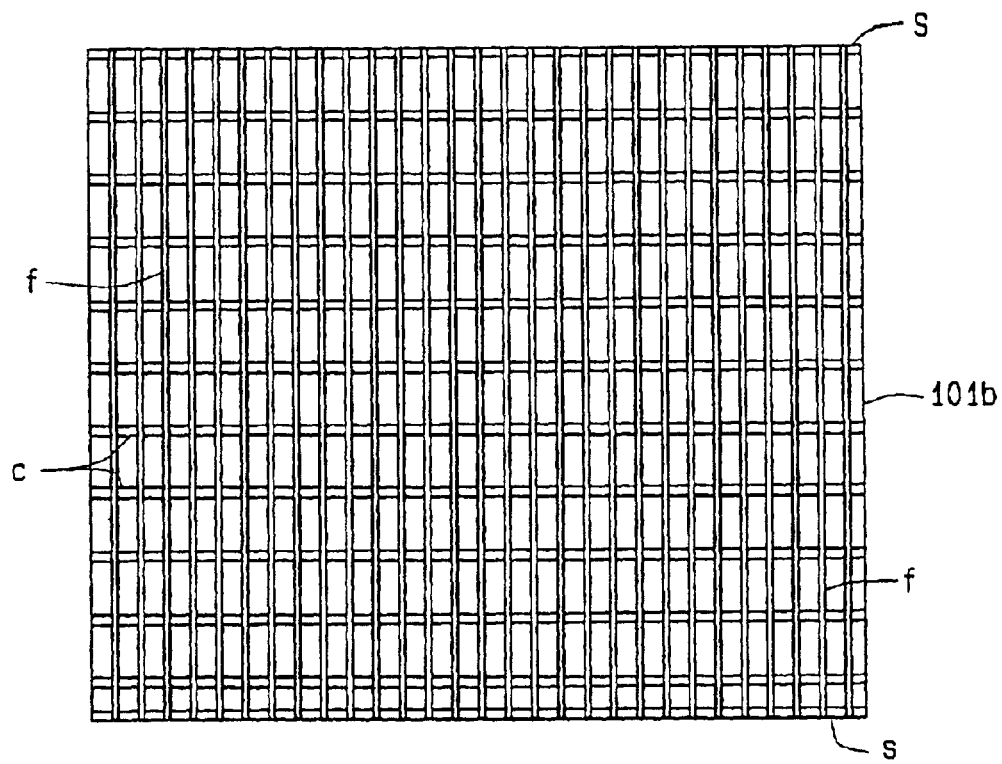
FIG. 6 shows a GDM-26 standard condenser, with a reverse fan motor/timer arrangement prior to a long test.
Figure 7:
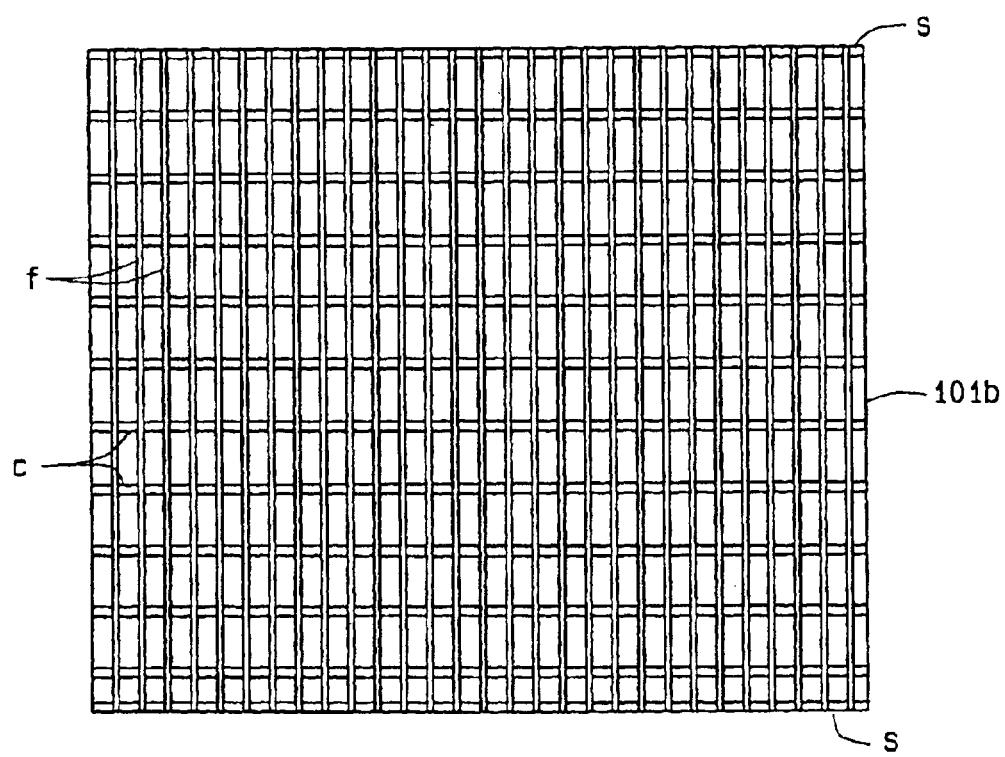
FIG. 7 shows the condenser of FIG. 7 following the long test.

The second merchandiser was also provided with a standard new condenser 101b with the reverse fan cooling system 100 of the present invention. The before and after conditions are represented by FIGS. 6 and 7, respectively, and demonstrate clearly that at the end of the test period there was no visible fouling.

Figure 8:
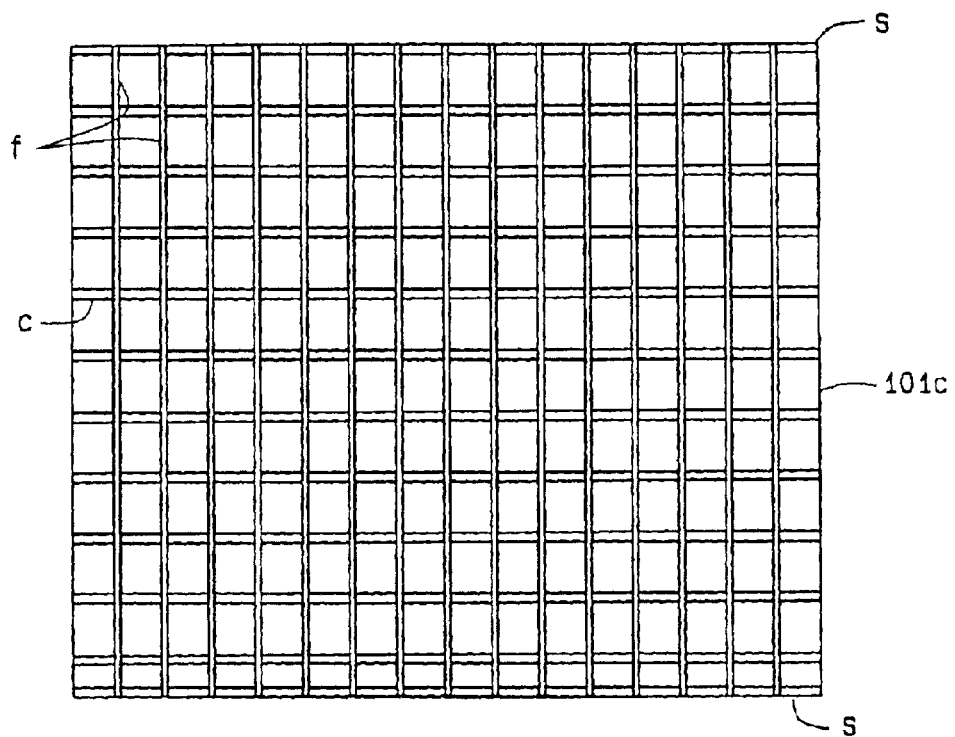
FIG. 8 shows a GDM-26 condenser with a low fin count prior to the long test.
Figure 9:
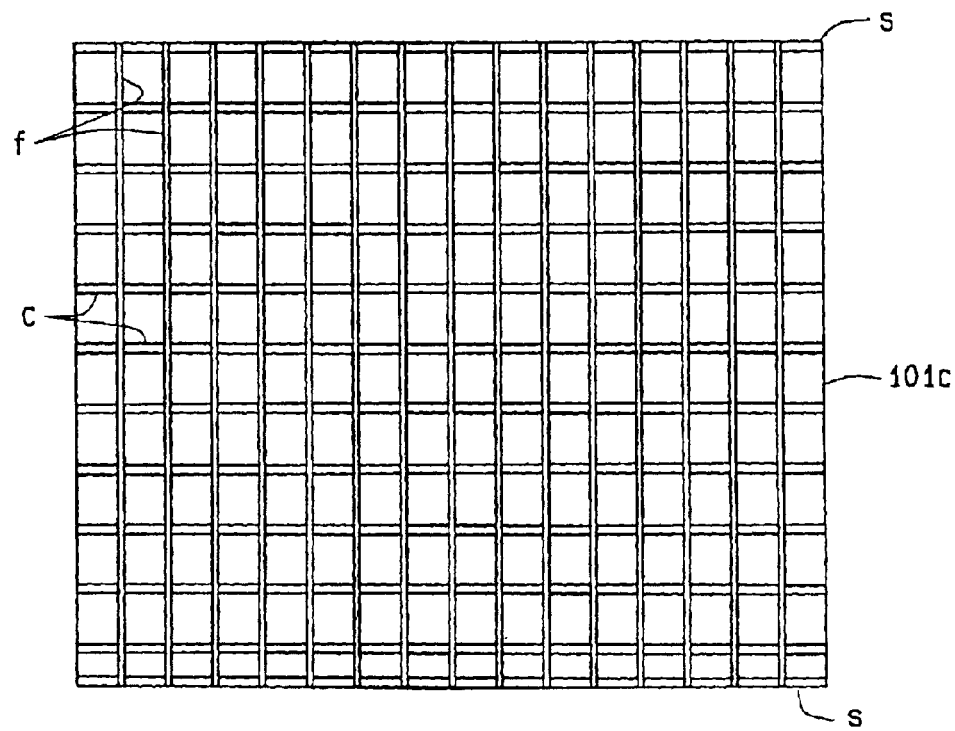
FIG. 9 shows the condenser of FIG. 9 following the long test.

The third merchandiser was provided with a new, low fin count condenser 101c with the reversing cleaning system of the present invention. The before and after conditions are represented by FIGS. 8 and 9, and again demonstrate clearly that at the end of the test period there was no visible fouling.

First Embodiment

Figure 11:
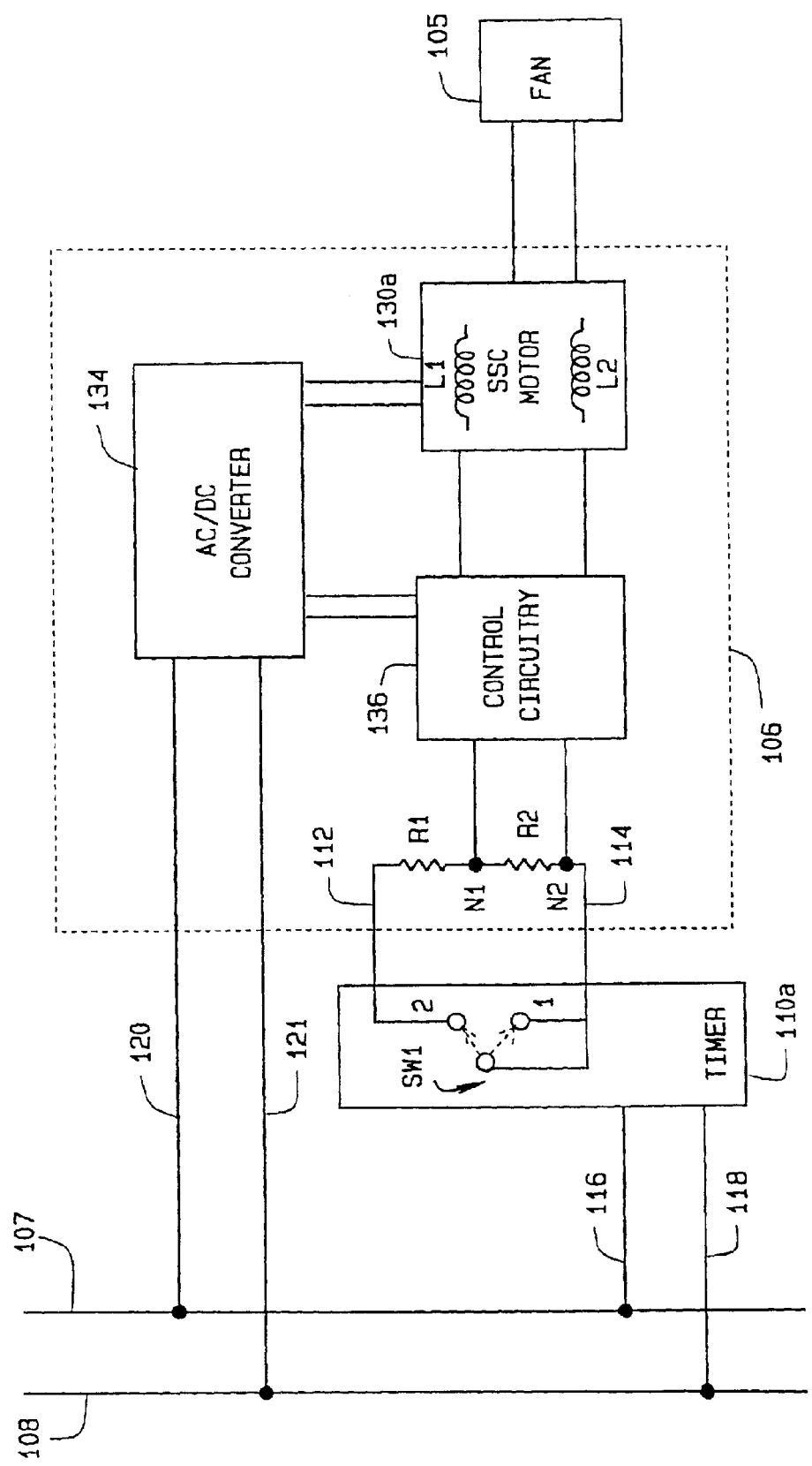
FIG. 11 is a schematic diagram of the SSC motor drive system, control circuitry and timer associated with the first embodiment of the present invention.

In the first embodiment of the present invention shown in FIGS. 1 and 11, the motor drive system 106 includes an SSC direct current motor 130a for converting electrical energy to the required driving torques over specified speed ranges for driving the fan 105; an AC to DC converter 134 which processes the electrical energy from the conductors 112, 114 into forms of controlled, stabilized power required by the motor 130a based upon signals received from control circuitry 136; and microprocessor based control circuitry 136, which adjusts the operation of the converter 134 based upon preprogrammed performance requirements and comparison of the programmed requirements to measured signals of actual performance.

The timing device 110 is timer 110a which controls the operation of a switch SW1 (shown in FIG. 11) associated with the timer 110a The SSC motor drive system 106 and the timing device 110 will now be described with greater particularity. The thermostatically controlled switch 109 applies power to the compressor motor 104 during refrigeration cycles via lines L1 and L2 and conductors 107 and 108. When the thermostatic switch 109 (FIGS. 1 and 1A) is closed during refrigeration or cooling cycles, power also is applied to the timer 110a via conductors 116 and 118, the SSC converter 134 via conductors 120 and 121, and control circuitry 136.

The timer 110a of the preferred embodiment is a motor driven timer manufactured under the trademark Mallory having a model number of M179 (with flying lead), and typically is used in defrosting applications. This timer is capable reliably switching current loads in the range 3 to 10 amps. Reliability data on this timer indicate warranty return rates of less than 0.1%. As discussed in greater detail below, the timer 110 monitors operation of the compressor motor 104 to determine when the compressor operates in the normal operating (cooling) mode (i.e., compressor on-time). When the timer 110 determines the compressor has operated in its normal operating mode for a predetermined time duration T1, the timer 110 causes the fan motor 130 and fan 105 to reverse their direction of rotation for a predefined time interval T2 corresponding to the cleaning cycle. After the cleaning cycle is complete, the timer 110 causes the fan motor 103a and fan 105 to return to normal operation. A solid state device which digitally accumulates and compares received time intervals signals with stored constants also can perform the timer switching function. As will be appreciated by those skilled in the art, switch SW1 can be replaced by a semiconductor element by using this technology.

As shown in FIG. 11, switch SW1 has two positions, namely, position 1 and position 2. During the interval in which the timer accumulates compressor on-time, switch SW1 is held in position 1. The control circuitry 136, which is implemented in digital logic within a microprocessor, senses a resistance value of resistor $R_2$ at nodes $N_1$ and $N_2$ when the switch SW1 is in position 1. The sensed value of resistor $R_2$ determines both the speed and direction of motor 130a rotation. For forward rotation, field winding $L_1$ is selected and energized, and fan 105 operates in condenser cooling mode at a first speed +v1. When the compressor thermostatic switch 109 (FIG. 1) opens, power is disconnected from all elements of the system 100. The timer 110 meanwhile has accumulated and stored the elapsed compressor on-time prior to opening of switch 109. When the switch 109 is closed at a later time, power again is supplied to the system 100, and the timer 110 resumes accumulation of compressor on-time.

In the preferred embodiment, this operational cycle during which the timer 110a monitors and accumulates data representative of compressor on-time continues until the total compressor on-time reaches the predetermined time duration T1. In the preferred embodiment, time T1 is approximately eight (8) hours. When the predetermined eight hour time duration T1 is reached, the timer 110a changes switch SW1 to position 2. In position 2, a new resistance value, that of resistors $R_1$ and $R_2$ in parallel, is sensed at nodes $N_1$ and $N_2$ by the control circuitry 136. A second speed −v2 is selected by the control circuitry 136, and motor field winding $L_2$ is powered, reversing the rotation direction of fan motor 130a. In the preferred first embodiment of the present invention, the first speed +v1 is less than the second speed −v2, with the first speed +v1 being approximately 1500 rpm during the cooling cycles and the second speed −v2 being approximately 2000 rpm during the cleaning cycles.

In the preferred embodiment, the timer 110a causes the fan motor 130a to reverse rotation direction during the cleaning cycle as soon as the predetermined time duration T1 of normal operation is reached (see FIG. 10 and discussion below). The cleaning cycle continues for the predefined time interval T2, with time interval T2 being approximately fourteen (14) minutes in the preferred embodiment. If the thermostatic switch 109 is opened before the completion of the cleaning cycle, the timer 110a causes the fan motor 130a to resume the cleaning cycle when power returns to the system 100 (i.e., switch 109 closes) until the predefined time interval T2 expires. When the cleaning cycle is complete, the timer 110a causes switch SW1 to return to position 1, and the motor 130a returns to its normal operating mode for the cooling cycle. If the predetermined time duration T1 of normal operation is reached at approximately the same time that switch 109 opens, the cleaning cycle is delayed until power is applied to the compressor motor 104 when switch 109 closes (see Graphs A and B of FIG. 10). The reversed air flow from fan 105 during the cleaning cycle removes any particle and/or lint accumulation on the condenser 101. While the preferred time interval T2 of approximately 14 minutes of reversed air flow has proved to be extremely effective for most working environments, it will be appreciated that this time interval T2 can be easily changed by modifications to both motor driven timers and semiconductor timers. Similarly, while the time duration T1 of the preferred embodiment is approximately 8 hours, it will be appreciated that time T1 can be easily modified, if desired.

During the refrigerating cycle (normal operating mode) as discussed above, the SSC motor 130a of the preferred embodiment operates at a forward or first speed +v1 of approximately 1500 rpm. During the cleaning cycle, the SSC motor 130a preferably operates at a reverse or second speed −v2 of approximately 2000 rpm. At this second speed −v2, the cleaning air flow energy is almost double that of the cooling cycle, promoting rapid particle and lint dispersal.

Another advantage of the first embodiment of the motor drive system 106 including the SSC motor 130a and associated control circuitry 136 is that both forward and reverse speeds +v1 and −v2 are closely controlled by the AC/DC converter stabilized power supply 134 which compensates for line voltage fluctuations. The control circuitry 136 also corrects fan speed for air load variations induced by varying degrees of foreign matter accumulation on the condenser 101 cooling surfaces.

Figure 10:
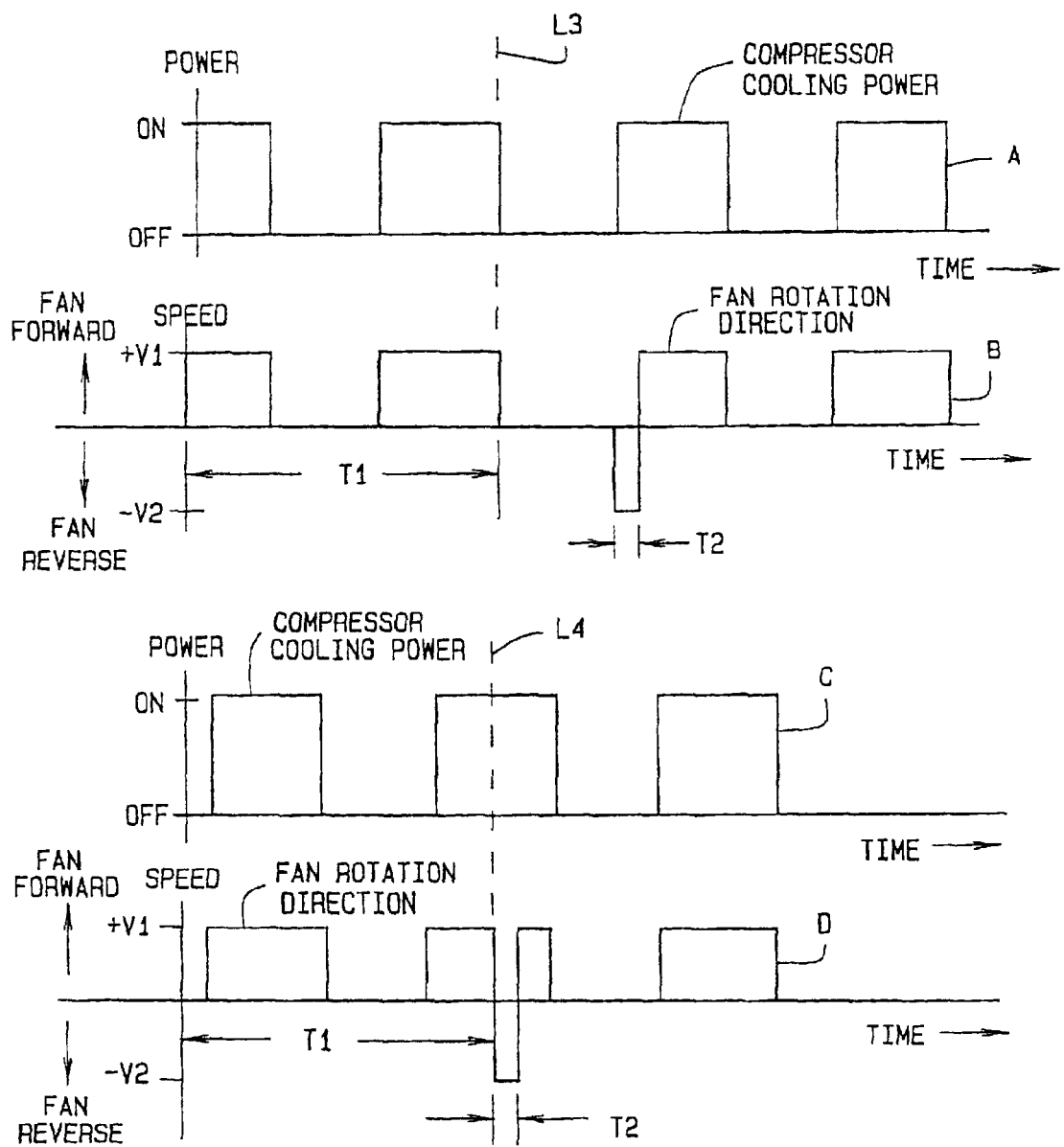
FIG. 10 shows duty cycle timing for the compressor and fan motors.

FIG. 10 illustrates possible timer 110a and switch SW1 operations during cooling and cleaning cycles for the SSC motor 130a. It will be appreciated that the timer and switch operations of FIG. 10 are the same for the RPSC motor 130b and switch SW2 as set forth in the second embodiment of the invention and discussed hereinafter. As discussed above, the timer 110 and motor drive system 106 are actuated when power is applied to the compressor 101 when switch 109 is closed. Graph A shows compressor power application with approximately 50% duty cycle. Line L3 intersects the time axis in graphs A and B at time T1 which represents the completion of a predetermined time interval of compressor on-time. Thus, in the preferred embodiment, line L3 represents a time interval T1 of approximately 8 hours of compressor 101 on-time.

Graph B illustrates motor 130 and fan 105 rotation in relation to compressor power application set forth as graph A. In graph B, speed +v1 corresponds to forward fan rotation at a first desired speed (e.g., approximately 1500 rpm for the SSC motor 130a and approximately 1500 rpm for the RPSC motor 130b). Speed −v2 corresponds to reverse fan rotation at a second desired speed (e.g., approximately 2000 rpm for the SSC motor 130a and approximately 1500 rpm for the RPSC motor 130b) If, at the time T1 corresponding to Line L3, switch 109 is open and power is not applied to the compressor 101 as shown in graphs A and B, the cleaning cycle is delayed until the next compressor on cycle. As shown in graph B, when power is supplied during the next compressor on cycle, the cooling fan is started and driven at −v2 (the reverse speed of approximately 2000 rpm) for the predefined time duration T2. In the preferred embodiment, time interval T2 is approximately fourteen (14) minutes. After expiration of time T2, the timer 110 causes the motor 130 and fan 105 to reverse direction of rotation to the forward direction at the first speed +V1 until power is no longer supplied to the system 100.

Graph C also represents compressor power application with approximately 50% duty cycle. Comparing graphs C and D, the total compressor on-time T1 of approximately 8 hours occurs during a power-on compressor interval. Line L4 intersects the time axis in graphs C and D at time T1 which represents the completion of a predetermined time interval of compressor on-time, indicating that power is available to the fan motor 130 when time T1 is reached. In this situation, the timer 110 causes the fan motor 130 to immediately reverse its direction of rotation and be driven at the second reverse speed −v2 for the predefined time interval T2 of approximately 14 minutes in the preferred embodiment. After time T2 expires, the timer 110 causes the fan 105 and motor 130 to reverse rotation to return to the forward direction of rotation at the first desired speed +v1.

The advantages of the SSC motor system in the reversing applications of the first embodiment over SP (shaded pole) and PSC (permanent split capacitor) motors include:

1. The SSC motor is capable of constant speed operation in both directions.
2. The SSC motor runs at constant speed regardless of the condenser air side static load.
3. The SSC motor is capable of running over a wide range of speeds.
4. The SSC motor runs cooler, operates at a power factor close to unity and therefore consumes significantly less power.
5. The SSC motor reliably reverses and cleans condensers for a variety of coolers. It is designed for a 30,000 cycle life and provides a life expectancy of over 50 years.

The Conversion using an SSC motor 130a

Converting a refrigerator cooler, such as a GDM-26 merchandiser manufactured by True Manufacturing Co., Inc., to a reverse condenser fan motor requires, for installation, a kit which includes the following components:

1. Timer—reversing 115/1/60;
2. Timer mounting bracket and screws; and
3. SSC Condenser fan motor—reversing 115/1/60.

The conversion is accomplished by performing the following steps:

1. Unplug the cooler from the power receptacle, to disconnect the power;
2. Remove the existing condenser fan motor from the compressor terminal box, noting how it is connected thereto;
3. Remove the condenser fan motor bracket and the condenser fan blade and install in exactly the same direction on the SSC reversing condenser fan motor 130a;
4. Re-install the condenser fan motor bracket on the condensing unit base and replace the condenser fan shroud, if needed;
5. Mount the timer bracket on the condensing unit base or elsewhere in the interior of the cooler;
6. Connect the condenser fan motor 130a and timer 110 power leads to the same compressor terminals from which the original condenser fan motor leads were removed, making sure all connections are tight, and tie-wrap and dress any extra wire length so it does not get caught in the rotating condenser fan blade;
7. Clean the condenser and the entire condensing unit compartment of excess lint, dirt and dust to ensure that the condenser starts in a clean condition. The SSC reversing condenser fan motor drive system 106 maintains this clean condition;
8. Reconnect the cooler to the power receptacle.

When the above procedure is followed, the reversing motor drive system 106 is powered directly off the compressor motor terminals. In addition, the timer 110 is powered off the same compressor terminals and is mounted on the condensing unit (compressor) base.

As discussed above, the timer 110 closes the control circuit of the reversing fan motor for about 14 minutes approximately every 8 hours of compressor run time in the preferred embodiment, thereby reversing the direction fan motor air stream and cleaning the condenser 101 of any unwanted material such as dirt and lint which has collected during normal operation. If the compressor run time is estimated at 50%, the condenser 101 is being cleaned by the reverse air stream for about 21 minutes daily. Tests have shown that this prevents any kind of accumulation of dirt or lint on the condenser surface.

Second Embodiment

Figure 12:
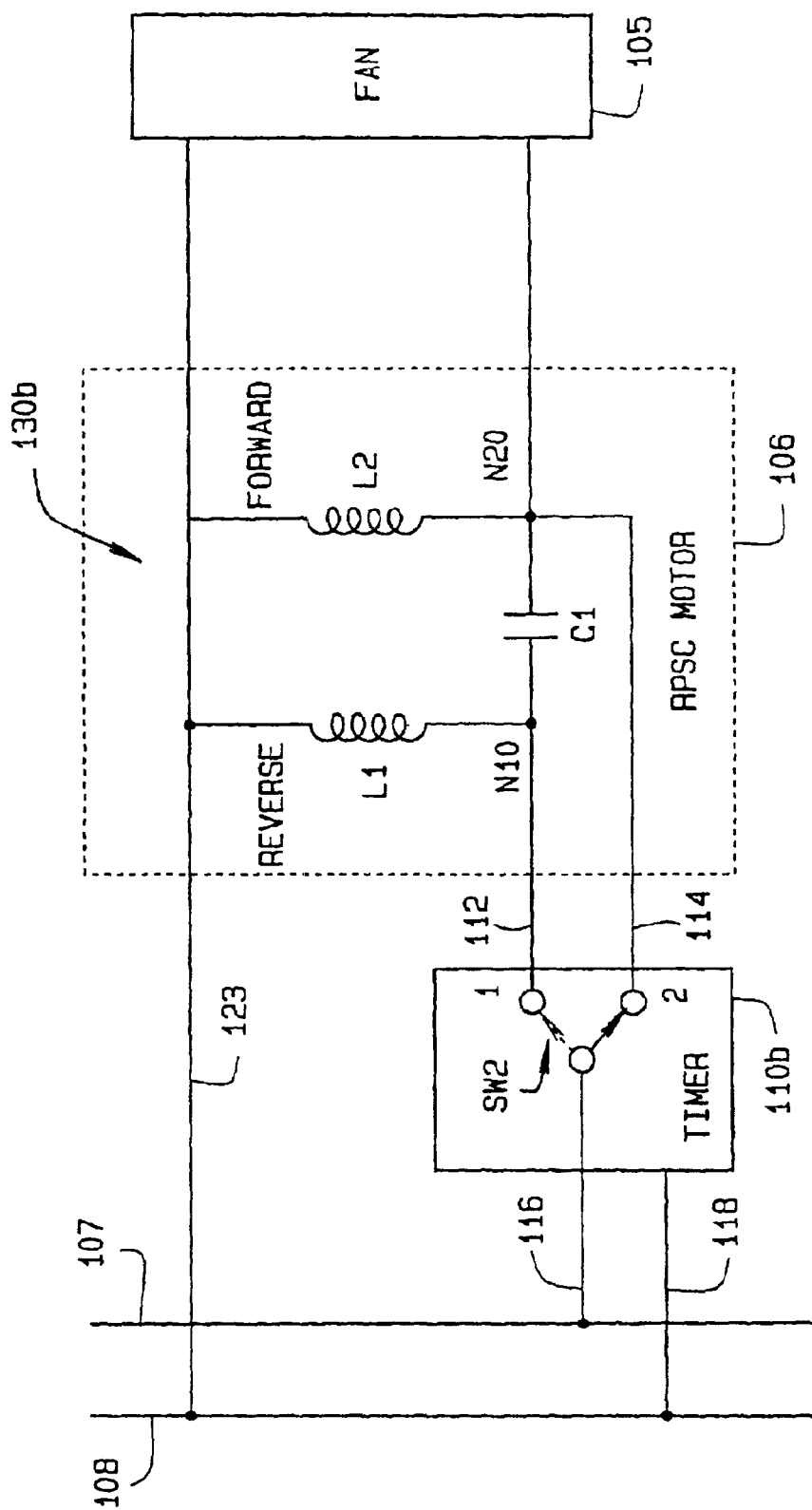
FIG. 12 is a schematic diagram of the RPSC induction motor and timer associated with the second embodiment of the present invention.

In the second embodiment of the present invention shown in FIGS. 1A and 12, the motor drive system 106 includes a reversible permanent split capacitor (RPSC) induction motor 130b for converting electrical energy to the required driving torques over specified speed ranges for driving the fan 105. The timing device 110 is timer 110b which controls the operation of a switch SW2 (shown in FIG. 12) associated with the timer 110b. It has been found that very good results can be achieved by using a RPSC motor 130b in the motor drive system 106 instead of the SSC motor 130a and associated control circuitry 136 and converter 134. Although the RPSC motor 130b does not operate quite as efficiently as the SSC motor 130a, the manufacturing costs of the drive system 106 using the RPSC motor 130b are less than the SSC motor 130a, therefore the choice of the RPSC motor 130b as opposed to the SSC motor 130a becomes largely a matter of economics.

In contrast to shaded pole and PSC motors, the RPSC motor 130b is designed so that the functions of its main (stator) winding and auxiliary (start) winding are interchangeable. Thus, the phase splitting capacitor C1 normally connected to the auxiliary winding is, in the RSPC motor 130b, switched from the start winding to the main winding. The auxiliary winding then functions as the stator winding. This forces the rotor to start and run in the direction of either of the clockwise and counterclockwise rotating magnetic fields present in the air gap between rotor and stator of the RPSC motor 130b. As discussed below in greater detail and shown in FIG. 12, the RPSC motor 130b includes windings L1 and L2, with winding L2 functioning as the main winding and winding L1 functioning as the auxiliary winding when operating in the forward direction during normal cooling cycles, and winding L1 functioning as the main winding and winding L2 functioning as the auxiliary winding in the reverse direction during cleaning cycles.

Referring to FIG. 12, timing and switching operations generally are the same as those described in the first embodiment shown in FIGS. 10 and 11. The timer 110b may be either a motor driven switch or a semiconductor device. The timer 110b of the second embodiment preferably is a motor driven timer manufactured under the trademark Mallory having a model number of M179 (stock). The timer 110b receives electrical power from lines 107 and 108 (FIGS. 1A and 12) and conductors 116 and 118 when the compressor is activated by switch 109. Power also is supplied to the motor 130b via line 108 and conductor 123.

The timer 110b controls the operation of switch SW2 (shown in FIG. 12) having a first position 1 and a second position 2. When power is applied to the compressor motor 104, switch SW2 may be in position 1 or position 2. If switch SW2 is in position 2, electrical power is applied to node $N_{10}$. Current flow is established in winding L2, which functions as the motor main winding. Current flow in winding L1 is phase advanced by capacitor C1, thereby creating the correct phase relationship for starting and accelerating the rotor to a first operational speed +v1 of approximately 1500 rpm. When the timer 110b accumulates a predetermined time duration T1 (approximately eight (8) hours) of compressor run time, timer 110b causes switch SW2 to change to position 1, and electrical power is applied to node $N_{20}$. Current flow is established in motor winding L1 which now functions the motor main winding. Current flow in L2 is phased advanced by capacitor C1, causing the motor 130b to start, reverse its original direction of rotation and began a cleaning cycle for the predefined time interval T2 of approximately fourteen (14) minutes duration at a second operational speed −v2 of approximately 1500 rpm in the preferred embodiment. Successive 8 hour compressor operating cycles therefore cause switch SW2 to alternate between positions 1 and 2, thereby maintaining successive fan motor cooling and cleaning cycles during system 100 operation. In contrast to the first embodiment of the present invention, the first speed +v1 and second speed −v2 of the second embodiment preferably are equal (i.e., approximately 1500 rpm). However, the preferred time intervals T1 (approximately 8 hours) and T2 (approximately 14 minutes) are the same in the first and second embodiments. As discussed above with respect to the first embodiment, it will be appreciated that the first and second speeds +v1 and −v2, respectively, and the time intervals T1 and T2 can be modified, if desired.

The field conversion or retrofit procedure for the RPSC motor 130b is exactly the same as described above with respect to the SSC motor 130a for any applicable refrigerator cooler.

In both embodiments discussed above, both the RSPC motor 130b and the SSC motor 130a and the timing device 110 are backward compatible for a "retrofit" kit. It will also be understood that both motors can be adapted to suit foreign power availability.

It will be understood that the term "lint" includes matted dust, dirt and the like, associated with a dirty condenser coil.

It will also be understood by those skilled in the art that the thermostatically controlled switch 109 for the compressor motor 104 may be activated in response, for example, to a change in a merchandiser evaporator temperature.

The purpose of this cleaning system is to prevent formation of lint and the like on a condenser coil using a reversible fan motor. The motors, timers and other components used and the operational speeds and time periods described have been very effective for this purpose with economy. However, it will be understood by those skilled in the art that other components and time periods may be used to provide satisfactory results. Accordingly, although the condenser cleaning system has been described by making detailed reference to preferred embodiments, such details of description are not to be understood as restrictive, numerous variants being possible within the scope of the claims hereunto appended.

What is claimed is:

1. A cleaning system for the condenser of a refrigeration unit, the system comprising:

a compressor including a motor operating in a normal operating mode during a refrigeration cooling cycle, a condenser, a cooling fan including a fan blade;

a motor drive system for driving the fan;

a power source supplying power to the cleaning system during the refrigeration cooling cycle; and control means for running the fan motor drive system during the refrigeration cooling cycle at a first selected speed in a forward direction to direct air toward the condenser for a first predetermined period of time and at a second selected speed in a reverse direction to direct air away from the condenser for a second predetermined period of time, the first and second periods of time being tolled when power is not supplied to the cleaning system, the speeds and the time periods being effective to prevent formation of lint on the condenser.

2. A cleaning system as defined in claim 1, wherein: the first selected speed is less than the second selected speed.

3. A cleaning system as defined in claim 1, wherein: the first predetermined time period is longer than the second predetermined time period.

4. A cleaning system as defined in claim 2, wherein: the fan is continuously run at the lower speed and the fan reversed several times a day to run at the higher speed in the opposite direction during the refrigeration cooling cycle when power is supplied to the cleaning system.

5. A cleaning system as defined in claim 1, wherein: the first selected speed is about 1500 rpm and the second selected speed is about 2000 rpm, and the first time period is about 8 hours and the second time period is about 14 minutes.

6. A cleaning system as defined in claim 1, wherein: the reversing motor drive system is powered directly off terminals associated with the compressor, thereby providing power to the motor drive system during the normal operating mode of the compressor.

7. A cleaning system as defined in claim 1, wherein: the control means includes a timer for monitoring and accumulating data representative of compressor running time during the refrigeration cooling cycle, the timer causing the motor drive system to drive the fan in the forward or reverse direction based upon the duration of compressor running time.

8. A cleaning system as defined in claim 7, wherein: the first selected speed is about 1500 rpm and the second selected speed is about 2000 rpm, the timer causing the motor drive system to run in the reverse direction for about 14 minutes after every 8 hours of compressor running time.

9. A cleaning system as defined in claim 1, wherein: the reversing motor drive system includes a solid state commutated motor.

10. A cleaning system as defined in claim 9, wherein: the first selected speed is less than the second selected speed.

11. A cleaning system as defined in claim 10, wherein: the first selected speed is about 1500 rpm and the second selected speed is about 2000 rpm, and the first time period is about 8 hours and the second time interval is about 14 minutes.

12. A cleaning system as defined in claim 1, wherein: the reversing motor drive system includes a solid state commutated motors, an electromechanical timer electrically connected to terminals of the compressor motor for monitoring and accumulating data representative of compressor running time during the refrigeration cooling cycle, an AC to DC converter for processing power supplied by the power source into controlled, stabilized power supplied to the solid state commutated motor, and control circuitry for controlling operation of the converter.

13. A cleaning system as defined in claim 1, wherein: the motor drive system includes a reversible permanent split capacitor motor.

14. A cleaning system as defined in claim 13, wherein: the first selected speed and the second selected speed are equal.

15. A cleaning system as defined in claim 14, wherein: the first selected speed and the second selected speed are about 1500 rpm.

16. A kit for retrofitting a refrigerator unit of the type comprising a compressor operating in a normal operating mode during a refrigeration cooling cycle when power is supplied to the unit, a condenser, a power source supplying power to the unit during the refrigeration cooling cycle and an original condenser fan motor and a fan blade with a condenser cleaning system, the condenser cleaning system kit comprising:
a replacement reversible condenser fan motor for driving the fan blade in a forward direction and a reverse direction; and
control means electrically connectable to the replacement fan motor for running the replacement fan motor during a refrigeration cooling cycle when Dower is supplied to the compressor alternately at a first selected speed in the forward direction to direct air toward the condenser for a first predetermined period of time, and in the reverse direction to direct air away from the condenser at a second selected speed for a second predetermined period of time, the first and second periods of time being delayed when power is not supplied to the compressor and resumed when power is supplied to the compressor, the speeds and the time periods being effective to prevent formation of lint, the control means including a timer electrically connectable to terminals of the compressor for monitoring and accumulating data representative of compressor running time during the refrigeration cooling cycle.

17. A kit as defined in claim 16, wherein: the reversible motor is a solid state commutated motor.

18. A kit as defined in claim 16, wherein: the reversible motor is a reversible permanent split capacitor motor.

19. A kit as defined in claim 17, wherein the timer causes the replacement fan motor to drive the fan in the forward or reverse direction based upon the duration of compressor running time.

20. A kit as defined in claim 17, wherein the first selected speed is less than the second selected speed.

21. A cleaning system for the condenser of a refrigeration unit, the cleaning system comprising:
a power source supplying power to the cleaning system during a refrigeration cooling cycle;
a thermostatically controlled switching device allowing for supply of power from the power source to the cleaning system during the refrigeration cooling cycle in response to temperature variations in the refrigeration unit;
a compressor including a motor operating in a normal operating mode during the refrigeration cooling cycle,
a condenser having refrigerant delivered thereto by the compressor,
a cooling fan including a fan blade;
a motor drive system for driving the fan alternately in a forward direction to direct air toward the condenser and in a reverse direction to direct air away from the condenser; and a control system for monitoring operation of the compressor motor and for running the motor drive system when power is supplied to the cleaning system during the refrigeration cooling cycle alternately in the forward direction at a first speed for a first predetermined period of time and in the reverse direction at a second speed for a second predetermined period of time based upon the duration of compressor running time during the refrigeration cooling cycle, the speeds and the time periods being effective to prevent formation of lint on the condenser; the control system including a timing device for accumulating and storing data representative of compressor running time during the refrigeration cooling cycle; the control system causing the fan to operate in the forward direction until the accumulated compressor running time reaches the first predetermined time period, the control system causing the fan to operate in the reverse direction after the first predetermined time period is reached, the control system causing the fan to operate in the reverse direction until the accumulated compressor running time reaches the second predetermined time period, the control system causing the fan to operate in the forward direction after the second predetermined time period is reached.

22. The cleaning system as defined in claim 21, wherein the timing device includes an electromechanical timer.

23. The cleaning system as defined in claim 21, wherein the motor drive system includes a solid state commutated motor.

24. The cleaning system as defined in claim 23, wherein the first speed is less than the second speed.

25. The cleaning system as defined in claim 21, wherein the first predetermined time period is longer than the second predetermined time period.

26. A cleaning system for the condenser of a refrigeration unit, the system comprising:
 a compressor including a motor operating in a normal operating mode during a refrigeration cooling cycle,
 a condenser,
 a cooling fan including a fan blade;
 a motor drive system for driving the fan;
 a power source supplying power to the cleaning system during the refrigeration cooling cycle; and
 control means for running the fan motor drive system during the refrigeration cooling cycle when power is supplied to the compressor alternately at a first selected speed in a forward direction to direct air toward the condenser for a first predetermined period of time and at a second selected speed in a reverse direction to direct air away from the condenser for a second predetermined period of time, the first and second periods of time being delayed when power is not supplied to the compressor and resumed when power is supplied to the compressor, the speeds and the time periods being effective to prevent formation of lint on the condenser.

* * * * *